United States Patent [19]

Sternberg

[11] Patent Number: 4,464,789
[45] Date of Patent: Aug. 7, 1984

[54] IMAGE ANALYZER FOR PROCESSING MULTIPLE FRAMES OF IMAGE DATA

[75] Inventor: Stanley R. Sternberg, Ann Arbor, Mich.

[73] Assignee: Environmental Research Institute of Michigan, Ann Arbor, Mich.

[21] Appl. No.: 378,358

[22] Filed: May 14, 1982

Related U.S. Application Data

[62] Division of Ser. No. 150,833, May 19, 1980, Pat. No. 4,369,430.

[51] Int. Cl.³ .............................................. G06K 9/56
[52] U.S. Cl. ..................................... 382/48; 358/105; 382/49
[58] Field of Search ............... 358/105, 107, 108, 109, 358/103; 343/5 MM, 7.7; 364/300; 356/388; 382/27, 49, 48

[56] References Cited

U.S. PATENT DOCUMENTS

| | | | |
|---|---|---|---|
| 3,836,710 | 9/1974 | Takahashi | 358/105 |
| 3,905,045 | 9/1975 | Nickel | 364/300 |
| 3,936,800 | 2/1976 | Ejiri et al. | 358/105 |
| 4,164,728 | 8/1979 | Marsh | 343/5 MM |
| 4,270,143 | 5/1981 | Morris | 358/105 |
| 4,288,815 | 9/1981 | Miles | 358/105 |
| 4,301,443 | 11/1981 | Sternberg et al. | 382/49 |
| 4,320,415 | 3/1982 | Jones | 358/105 |
| 4,322,716 | 3/1930 | Sternberg | 382/49 |

OTHER PUBLICATIONS

Castleman, Kenneth R., "Digital Image Processing", Prentice-Hall, pp. 96-97.

Primary Examiner—Leo H. Boudreau
Attorney, Agent, or Firm—Krass and Young

[57] ABSTRACT

A method of analyzing multiple frames of image data wherein each frame is represented by a matrix of pixels fed serially from a source for processing. A first frame of pixels is transformed in at least one serial neighborhood transformation stage to detect spatial locations associated with given objects in the frame. A second frame of pixels is subsequently transformed to detect the spatial locations associated with the objects in that frame. Then, the differences between the transformations of the first and second frames are analyzed to detect changes in the number of and/or location of the objects between frames.

7 Claims, 9 Drawing Figures

FRAME #1

FRAME #2

IMAGE ANALYZER FOR PROCESSING MULTIPLE FRAMES OF IMAGE DATA

This application is a divisional application of U.S. application Ser. No. 150,833, filed May 19, 1980, now U.S. Pat. No. 4,369,430 issued Jan. 18, 1983.

BACKGROUND OF THE INVENTION

This invention relates to image analyzers. More particularly, it involves a pipeline of neighborhood serial transformation stages for analyzing image data.

In commonly assigned U.S. Pat. No. 4,167,728 to Sternberg, there is disclosed a new class of special purpose computers for implementing pattern recognition and analyses. The system includes a chain or pipeline of serial neighborhood transformation modules or stages. Each stage includes a neighborhood extraction portion for sequentially accessing an array of neighboring pixels in the image, the image being represented by a serial stream of digital pixel values corresponding to a matrix of points in the image. Neighborhood transformation logic generates a tranformation output to the next stage depending upon the pixel values contained in the neighborhood extraction portion. The transformed data is a function of the value of the equivalent data point in the input image matrix and the values of the neighboring pixels in the image. The nature of the transformation performed by each of the processing stages may be modified under control of a central programmable unit which communicates with each stage. In the embodiment disclosed in this patent the output of the last stage of the pipeline was coupled to a utilization device such as a display for displaying the transformed matrix.

The present invention is directed to techniques for increasing the image processing capabilities of such a system. Other aspects of the invention are directed to using at least one of the serial neighborhood processing stages to analyze multiple frames of image pixel data.

SUMMARY OF THE INVENTION

According to one aspect of this invention, feedback means are provided for coupling the output of the last stage of the pipeline to the input of the first stage. In a preferred embodiment, enough stages are included in the pipeline to contain all of the pixels in the image matrix. The stages are first programmed to perform a first sequence of neighborhood transformations. The pixels are shifted through the pipeline with each of the stages performing the programmed transformation. Before the pixels are recirculated through the pipeline, the stages are progressively reprogrammed with new control instructions whereby the image pixels may be transformed a greater number of times than there are stages in the pipeline.

Pursuant to another aspect to this invention, the pipeline or at least one serial neighborhood transformation stage thereof is used to transform two image frames of pixel data from a data source. The transformation outputs of the pipeline for each of the frames are compared with one another. Accordingly, changes in the image contained in the two frames of pixel data can be detected. Preferably, indicia of the transformation output of the pipeline for one of the frames is fed back and combined with pixel data from subsequent frames. The fed back indicia is carried along in the pipeline but is not transformed by the stages until the complete transformation sequence of the subsequent frame is completed. The last stage in the pipeline does take into account the fed back indicia as well as the transformed pixel values of the subsequent frame. Accordingly, the final transformation output of the pipeline is a function of two frames of pixel data. The prior art recognizes that by subtracting two images of the same scene using algebraic operations it is possible to detect changes between the two images. Applicant's method enables one to isolate on the spatial locations of given objects in successive frames or pictures of a common scene. In other words, the present invention provides the capability of isolating solely on changes of given objects between the two frames. It can be appreciated that the gross image subtraction technique suggested by the prior art will detect all changes between the two frames and that it would be difficult to just delete changes in a given object in relatively complex image matrices.

BRIEF DESCRIPTION OF THE DRAWINGS

These and other advantages of the present invention will become apparent upon reading the following specification and by reference to the drawings in which:

FIGS. 6 (A-B) is an illustrative example of a first frame of pixel data transformed to detect the spatial locations of a given object therein; and FIGS. 7 (A-B) is an illustrative example of a second frame of pixel data that has been combined with the transformed pixel data of FIG. 6 (B), the pixel data of the second frame being transformed to detect the spatial locations of the given object therein.

DESCRIPTION OF THE PREFERRED EMBODIMENT

Figure 1:
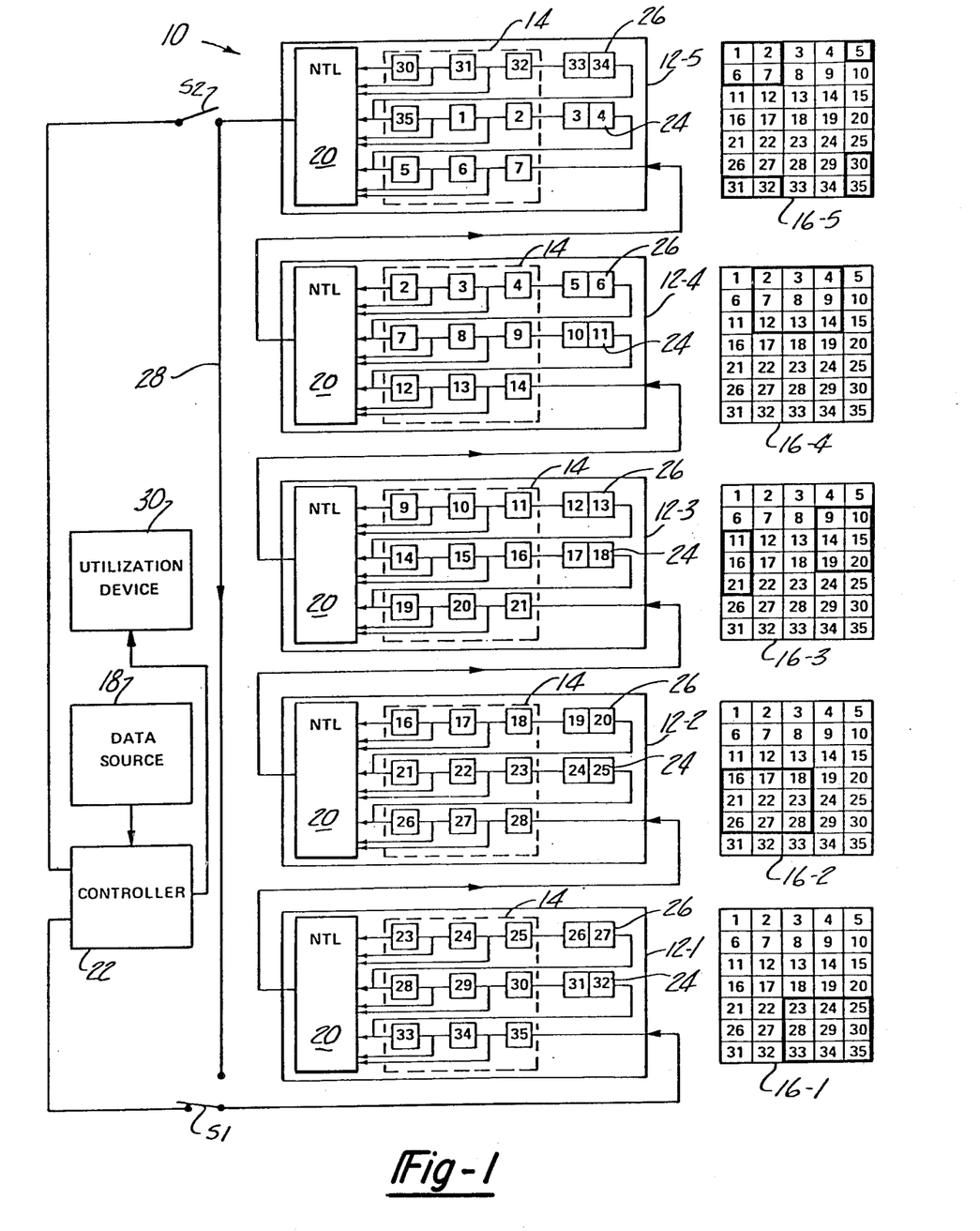
FIG. 1 is a schematic diagram of one embodiment of this invention during one time step.

Referring now to FIG. 1, the image processor of the present invention takes the form of a pipeline 10 of serially connected neighborhood transformation stages 12. In this embodiment there are five stages 12-1 to 12-5 but it should be understood that this number may vary greatly. The circuitry in each stage includes a neighborhood extraction portion 14 for accessing an array of neighboring pixels. In this specific example, the image to be analyzed is represented by a matrix 16 of thirty-five pixels arranged in a 5×7 array. It should be understood that the image matrix 16 generally includes many more such pixel values in normal use. However, the matrix has been simplified in order to aid in more easily understanding the broad concept of the present invention. The pixel values are generally derived from a scanner and are supplied thereby in a raster scan line format. The matrix of pixel values are supplied by data source 18 in a serial fashion to the pipeline 10.

Each stage 12 further includes neighborhood transformation logic 20 which provides a transformation output signal depending upon the contents of the pixels contained in the neighborhood extraction portion 14. The type of analysis performed by the neighborhood transformation logic 20 in each stage 10 is determined by control or command instructions from a central programmable controller 22. Line storage devices 24, 26 in each stage provide an appropriate delay such that each shift of the pixel stream will place a new window of neighboring pixels in the neighborhood extraction portion 14. The lengths of the line delays 24, 26 will of course depend upon the length of the lines in the image matrix 16 as is well known in the art. Other methods of loading neighborhood extraction portion 14 with successive neighborhood windows can be employed.

The system thus far described is substantially the same as that disclosed in the above-identified U.S. Pat. No. 4,167,728 to Sternberg which is hereby incorporated by reference. The pipeline 10 can be programmed by controller 22 to provide a wide variety of neighborhood transformations. Examples of such neighborhood transformations are more fully described in U.S. Pat. No. 4,322,716 entitled "Method and Apparatus For Pattern Recognition and Detection"; U.S. Pat. No. 4,301,443 "Bit Enable Circuitry For An Image Analyzer System"; and U.S. Pat. No. 4,290,049 entitled "Dynamic Data Correction Generator For An Image Analyzer System"; all of which were filed on Sept. 10, 1979 and are assigned to the same assignee as the present invention. These applications are likewise incorporated by reference. Briefly, through a series of erosion and dilation transformation steps carried out in each stage, the spatial location of a particular object or pattern can be located in the image matrix. The number of stages required to perform the entire transformation sequence will vary depending upon the complexity of the task. However, one aspect of the present invention is directed toward minimizing the number of stages required to perform any particular sequence.

Figure 2:
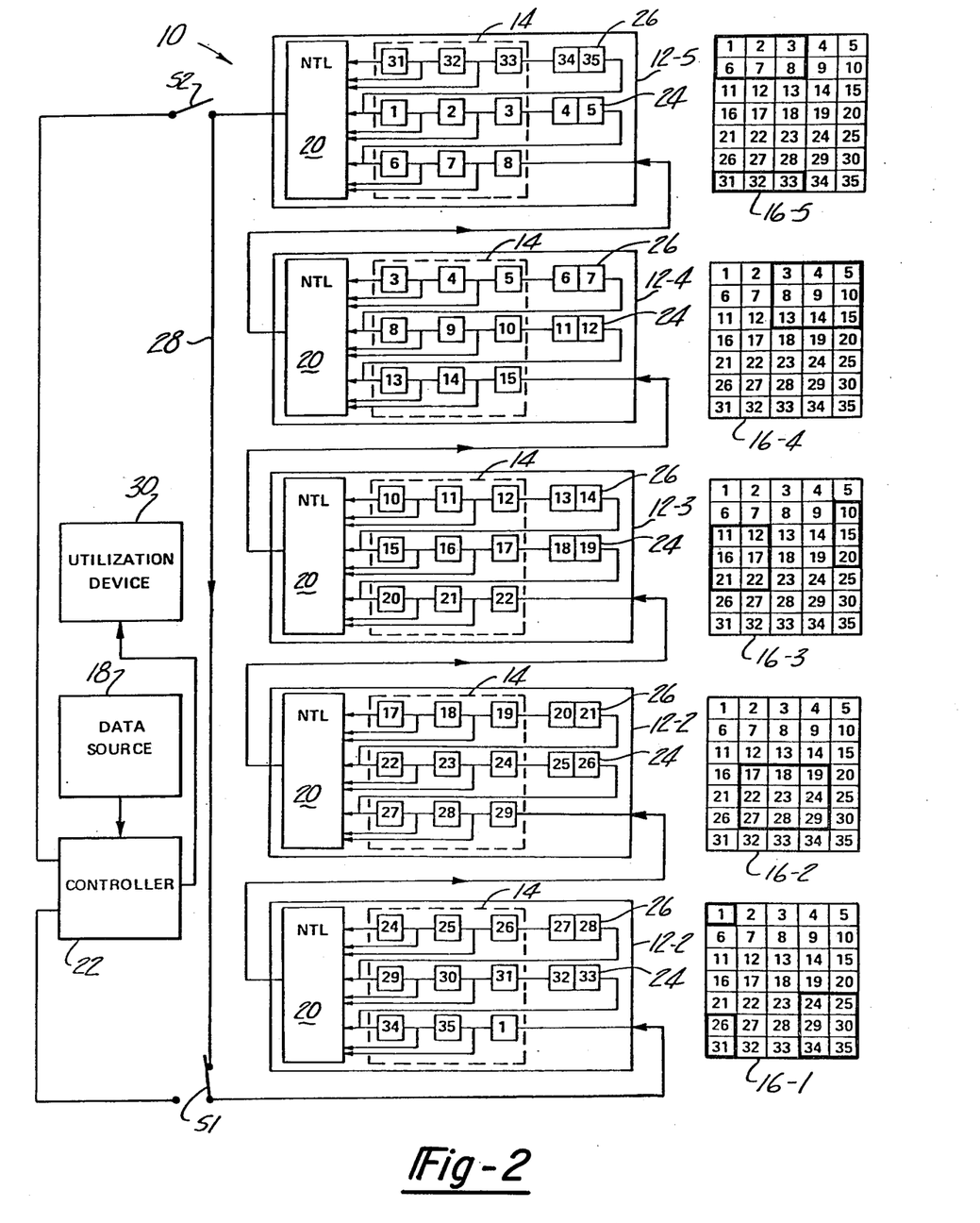
FIG. 2 is a schematic diagram showing the shift in pixel values in the embodiment shown in FIG. 1 during the next time step.
Figure 3:
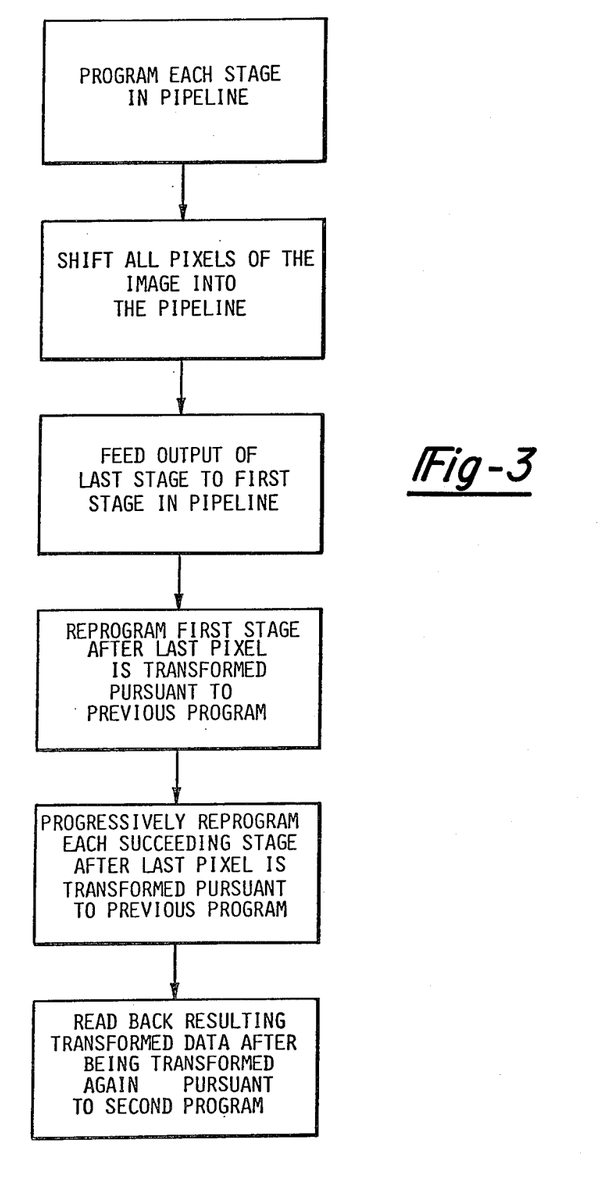
FIG. 3 is a flow chart showing the sequence of steps in carrying out a preferred method of utilizing the system of the present invention.

By way of a specific example and with reference to FIGS. 1–3, assume that there are ten transformational steps required in a given sequence for locating a particular object in image matrix 16. The neighborhood transformation logic 20 of stages 12-1 to 12-5 are first loaded with control instructions from controller 22 for carrying out the first five steps of the sequence. The pixel data from data source 18 is then loaded into pipeline 10. The position of a switching device S1 conceptually represents that the data entering the pipeline is fresh data from data source 18. The pixel data may be conditioned and then serially provided in an appropriately timed manner by controller 22. Additionally, controller 22 controls the position of switching device S1. It should be noted that switching device S1 may be a variety of electronic components and may comprise, for example, conventional multiplexing circuitry. The pixel data enters the input of stage 12-1 and is shifted through the storage devices making up neighborhood extraction portion 14 and line storage devices 24, 26. The output of the first stage 12-1 is coupled to the input of second stage 12-2 and so on up the pipeline 10. The numerals in the storage devices making up neighborhood extraction portion 14 and line storage devices 24-26 in FIG. 1 shows the position of the pixels when all of the pixels in matrix 16 have been loaded into pipeline 10. The darkened lines in matrix 16 surround those pixel values which are contained in the neighborhood extraction portion 14 for its adjacent stage 12. For example, the darkened lines in image matrix 16-1 denotes the pixels of the neighborhood windows contained in neighborhood extraction portion 14 of stage 12-1. Each pixel value is transformed when it is in the center position of the neighborhood extraction portion 14. Thus, as the pixel data propagates up the pipeline 10, it is tranformed by each of the stages. For example, pixel No 1 which is in the center cell position of stage 12-5 has already been transformed by the previous stages by the time it reaches the position shown in FIG. 1. Note also that the transformed output of each stage is a function of a center cell or pixel and the surrounding pixels in the neighborhood window. For example, pixel 28 in stage 12-2 is the transformation output of stage 12-1 during the previous time step in which pixel 28 was contained in the center of neighborhood extraction portion 14 of the first stage 12-1.

FIG. 2 shows the pipeline 10 during the next time step after all of the pixels have been loaded from data source 18 into the pipeline 10. Note the condition of switch S1. Controller 22 will now generate appropriate signals to cause switch S1 to couple the output of stage 12-5 to the input of the first stage 12-1 over feedback line 28. Consequently, the pixel data entering stage 12-1 is not fresh data from source 18 but instead represents transformed data which has been transformed by the previous stages which have carried out the first five of the ten step sequence in this example. In other words, pixel No. 1 in stage 12-1 of FIG. 2 has already been transformed five times, once by each of the stages 12-1 to 12-5.

When pixel number 35 has been shifted into the center position of the neighborhood extraction portion 14 of stage 12-1, it will perform the last transformation pursuant to the previously programmed transformational control instructions. Before the next pixel shift, stage 12-1 is reprogrammed with new transformational control instructions from controller 22 for carrying out the sixth step in the sequence. Thus, when pixel number 1 is shifted into the center position of extraction portion 14, the neighborhood transformation logic 20 will provide a transformation output for stage 12-1 pursuant to the new instructions.

Once the last pixel, here pixel number 35, has reached the center cell in the neighborhood extraction portion 14 of the second stage 12-2, the second stage neighborhood transformation logic 20 is likewise reprogrammed. The new transformation control instructions will condition the neighborhood transformation logic 20 of the second stage 12-2 to carry out the seventh step in the ten step sequence. Thus, when pixel number 1 reaches the center cell, it will be transformed according to the new program instructions. This same operation occurs as the recirculated pixel data propagates up through the stages 12 in the pipeline 10. In other words, stage 12-3 will be programmed with the eighth transformation step instructions, stage 12-4 with the ninth, and stage 12-5 will be reprogrammed for carrying out the tenth step in the operation. Thus, the pixel values eminating from the output of stage 12-5 will be transformed ten times by one five different neighborhood transformation stages. The output of stage 12-5 may be read by controller 22 by closing switch S2. Controller 22 may then couple the transformed data to a utilization device 30. Utilization device 30 may, for example, activate an alarm or other device if a particular pattern has been detected by the foregoing ten step transformation operation sequence.

The feedback approach just described has several advantages in addition to decreasing the number of stages required to perform a particular operation. Faster image processing is obtained because the pixel data does not have to be transferred through as many input/output devices which inherently slows down the processing time. Additionally, the amount of required external storage is substantially reduced.

Figure 4:
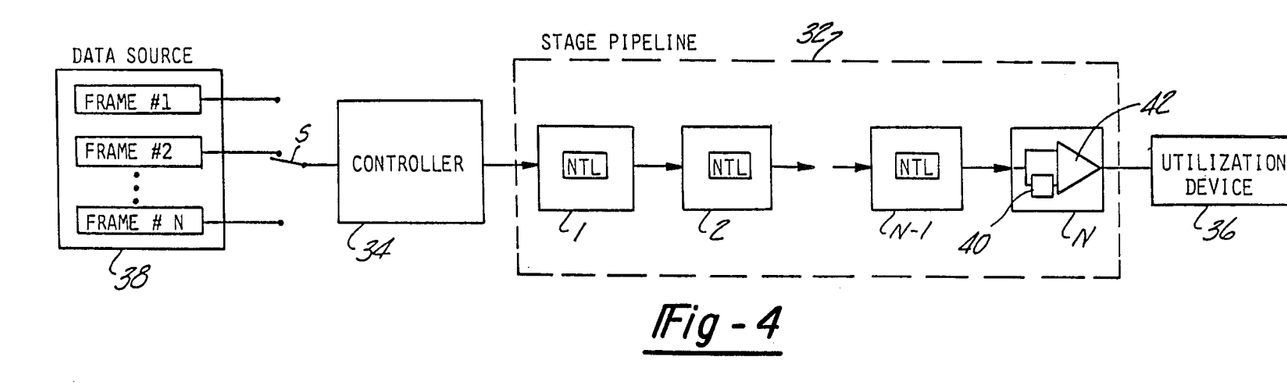
FIG. 4 is a schematic diagram showing an alternative embodiment of the present invention.
Figure 5:
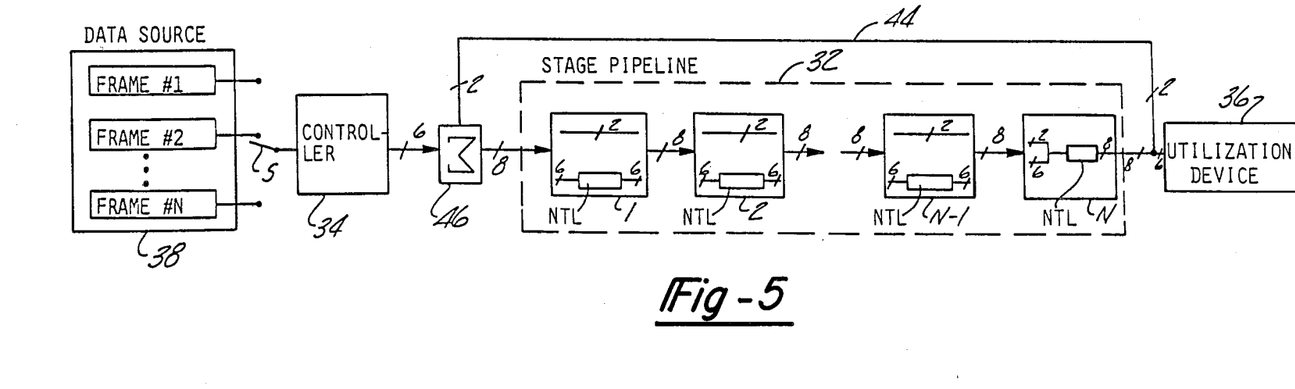
FIG. 5 is a schematic diagram showing still another embodiment of the present invention.

FIGS. 4 and 5 provide conceptual illustrations of other aspects of this invention. In the embodiment shown in FIG. 4, the pipeline 32 includes a plurality of transformation stages 1 to N. Each stage is the same as stages 12 previously discussed in connection with FIGS. 1-3 and includes neighborhood transformation logic (denoted NTL in the drawings). Similarly, the system includes a controller 34 and a utilization device 36. The data source 38, however, provides different frames of pixel data. For purpose of this invention, a frame is a matrix of pixel points of an image taken at one instance in time. For example, each frame may contain image information relating to the same budding tree taken at different times. The neighborhood transformation stages 1 to N-1 are programmed by controller 34 with a bud finding algorithm or operational sequence. Controller 34 then couples the first frame from data source 38 into the pipeline 32. The last stage N is programmed to store the transformation output of stage N-1 as represented by storage device 40. In our example, storage device 40 would contain information relating to the location and number of buds found within the first frame of pixel data. Controller 34 then couples the second frame of pixel data through the pipeline 32. Stage N is further programmed to perform a comparison between the current transformation output of stage N-1 with the contents of storage device 40 which contains information relating to the first frame. Any differences between the transformed outputs of the two frames will be detected by stage N as represented by comparator 42. The output of pipeline 42 is coupled to a utilization device 36 which, for example, may count the number of new buds on the tree that appeared in the second frame of pixel data. The transformed data of the second frame replaces that of the first frame in storage device 40. This process continues for each frame within data source 38. Consequently, each new frame selected by controller 34 will be compared with updated image information such that the number and location of new buds on the tree can be detected over a period of time.

FIG. 5 shows a particular implementation for carrying out the concept previously discussed in connection with FIG. 4. In this embodiment, a feedback line 44 serves to feedback at least a portion of the output of the stage pipeline 32 to a summation device 46. Device 46 is operative to combine new pixel data from data source 38 with previously transformed pixel data on feedback line 44. Assume that each pixel is represented by six bits. When the first frame from data source 38 is shifted through the stages of pipeline 32, the transformation output may contain information regarding the location and number of the buds on the tree. The output of the pipeline 32 may be represented by eight bits, two of which are fed back over line 44 to summation device 46.

Controller 34 then selects the next frame of data from source 38. Summation device 46 serves to combine the two bit information associated with the first frame of data with the six bit information regarding the second frame of data. However, the pipeline stages are programmed to ignore the two bits of transformed data from the first frame. In other words, two bits for each pixel will pass through the neighborhood stages 1 to N-1 unmodified. In comparison, the six bits of new data will be transformed in the neighborhood transformation logic of each of the stages 1 to N-1. This so called "bit masking" technique is more fully described in the aforementioned U.S. Pat. No. 4,301,443 entitled "Bit Level Enable Circuitry For An Image Analyzer System". The last stage, however, is programmed to perform a transformation on all eight bits of the pixel data. Stage N can readily be programmed to effectively compare the locations of the tree buds of the previous frame (for example, as represented by two of the bits) with the transformed data of the current frame (represented by six of the bits). Selected bits are coupled over feedback line 44 for use in analyzing the next frame. Thus, the output of transformation stage N will detect the differences between two successive frames of image data.

As disclosed in the referenced U.S. Pat. No. 4,301,443, each stage includes a plurality of input lines forming an input data bus, with each line carrying a particular bit of the multi-bit pixel. Selector means are coupled to the input data bus for selecting particular data bits in the data signal for analysis by each stage. A central controller coupled to the selector means controls the selection of the particular bits in each pixel to be analyzed by each stage.

Figure 6A:
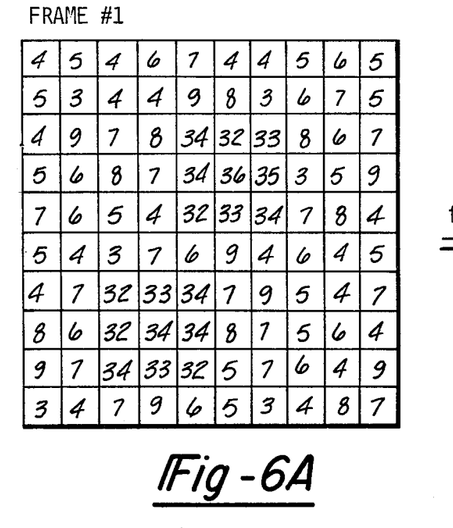
Figure 6B:
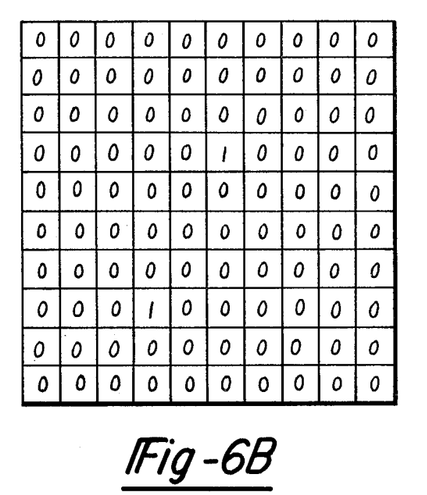
Figure 7A:
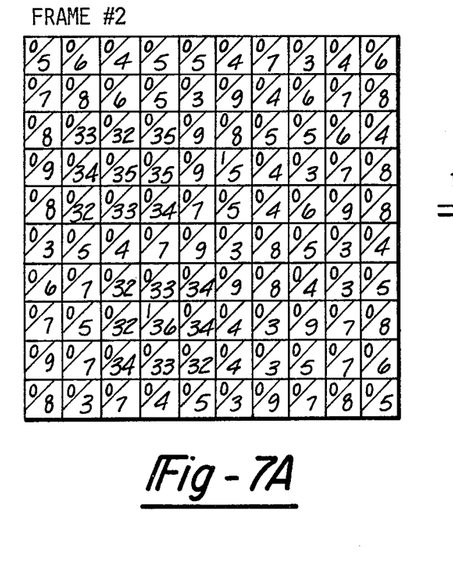
Figure 7B:
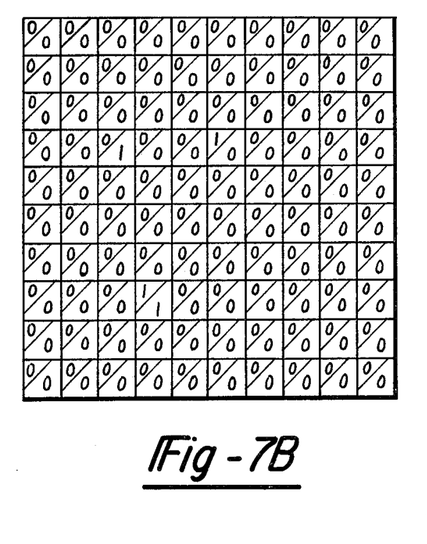

Reference to FIGS. 6 and 7 will help to clarify the understanding of the operation of this invention. By way of a specific example, FIG. 5A illustrates a simplified pixel matrix where the background pixel values are represented by values ranging from 3-9. The location of the objects is depicted by larger pixel values ranging from 32-36. A study of FIG. 6A shows that there are two objects (here, tree buds) contained within the first frame of pixel data. This pixel data is transformed in one or more stages by a series of serial neighborhood transformations to generate the transformed matrix shown in FIG. 6B. In FIG. 6B, the locations of the tree buds are denoted by pixel values of 1 whereas the remaining pixel values have values of 0.

As illustrated by the feedback line 44 in FIG. 5, the transformed matrix of FIG. 6B is fed back to the input of pipeline 32. Since the pixel values of the transformed matrix of FIG. 6B have only two possible values (ones or zeros) only a limited number of bits are required to be used. As shown in FIG. 5, two bits per pixel are available but actually only one bit is required. The fed back information is combined with corresponding pixel positions of the second frame of pixel data via device 46. Each pixel in the second frame can be represented with $6^2$ or 64 different values. Since each stage in the pipeline is capable of operating on 8 bits per pixel, the six lower level bits can be used to represent the pixel values for the second frame of image data whereas the two most significant bits can be used to represent the transformed pixel data of FIG. 6B. This is a diagramatically illustrated in FIG. 7 where the upper left corner of each pixel position includes a value (0 or 1) associated with the transformed pixel matrix of FIG. 6B that has been combined with the pixel values of the second frame. As with the first frame, pixel values of 3-9 represent background and values of 32-36 represent object information in the second frame of pixel data. A review of FIG. 7A shows that there are two objects located in the second frame; one of the objects being in the same spatial location as that in the first frame, the second object in the first frame no longer being in the same position, and that another object having a different location is found in the second frame.

The stages are programmed so as to transform the sixteen pixel data of the second frame while passing those bits associated with the first frame through the stages unmodified. In other words, the stages operate solely on the six-bit per pixel values of the second frame but ignore those bit positions containing the information from the transformed first frame.

FIG. 7B shows the result of the transformation of the second frame. A comparison then can be made between selective bit positions of each pixel to detect differences between the number and spatial location of the object between the two frames. Reference to FIG. 7B will illustrate that there has been no change in the object located in the lower left hand corner or each pixel frame. However, the object in the upper portion of Frame 1 is no longer in its original position and an object has been detected in the second frame of pixel data to the left of the previously occupied location of the object in the first frame.

A wide variety of alternative uses can be readily envisioned. For example, this feedback approach can be used for filtering out noise in image data. It can also be used to detect movement of particular objects between successive frames of pixel data. One skilled in the art will appreciate that the information fed back to the pipeline 32 input can be easily varied and used in a multitude of different image processing operations.

Other modifications falling within the spirit of the present invention can be obtained by a study of the drawings, specification and the following claims.

I claim:

1. A method of analyzing multiple image frames, each frame being represented by a matrix of pixels fed serially from a source for processing, said method comprising:
   transforming a first frame of pixels in at least one serial neighborhood transformation stage to detect spatial locations associated with a given object therein;
   retaining indicia of the transformation of the first frame associated with the spatial locations of said object;
   subsequently transforming a second frame of pixels in at least one serial neighborhood transformation stage to detect spatial locations associated with said object therein; and
   analyzing the difference between the transformation of the first and second frames to thereby detect changes of said object between frames.

2. The method of claim 1 wherein each pixel is represented by a multibit binary data signal and each frame is transformed by a pipeline of individually programmable stages, said method further comprising the step of feeding back selected bits of each transformed pixel of the first frame associated with the spatial location of the detected object thereon from the output to the input of the pipeline.

3. The method of claim 2 which further comprises the steps of:
   combining the selected feedback bits of the transformed first frame of pixel data with bits corresponding to the same pixels in the second frame; and
   shifting said combined bits through the pipeline of stages, with said feedback bits being passed unmodified through selected stages of the pipeline.

4. A method of automatically detecting changes in particular objects between multiple frames of a scene, said method comprising:
   scanning the scene to provide a first frame of serial pixel data;
   subsequently scanning the scene to provide a second frame of serial pixel data;
   using at least one serial neighborhood transformation stage to detect the spatial locations of a particular object in the scene by transforming the pixels in the first frame;
   combining data associated with said transformed pixels with corresponding pixels in the second frame;
   transforming the pixels in the second frame in at least one serial neighborhood transformation stage to detect the spatial locations of said object therein while passing the previously transformed data unmodified through the stage; and
   comparing the differences between the transformations of the first and second frames to detect for changes of the object therebetween.

5. The method of claim 4 wherein said transformations are performed in a pipeline of substantially identical individually programmable stages.

6. A method of automatically detecting changes in particular objects between plural image frames taken of a generally common scene, each frame being represented by a matrix of pixels, said method comprising:
   using neighborhood transformations to transform the matrix of a first frame to detect spatial locations within the matrix associated with a given object;
   using neighborhood transformations to transform the matrix of a second frame to detect spatial locations within that matrix associated with said given object; and
   analyzing the transformations of the first and second frames to thereby detect changes of said object between frames.

7. The method of claim 6 wherein said matrices are fed serially from a data source and are transformed in at least one serial neighborhood transformation stage.

* * * * *

UNITED STATES PATENT AND TRADEMARK OFFICE
CERTIFICATE OF CORRECTION

PATENT NO. : 4,464,789
DATED : August 7, 1984
INVENTOR(S) : Stanley Sternberg

It is certified that error appears in the above–identified patent and that said Letters Patent are hereby corrected as shown below:

Column 6, line 47, delete "$6^2$" and insert --$2^6$--.

Column 6, line 52, delete "a".

Column 6, line 67, delete "sixteen" and insert --six-bit--.

Signed and Sealed this

Eighteenth Day of June 1985

[SEAL]

Attest:

DONALD J. QUIGG

Attesting Officer     Acting Commissioner of Patents and Trademarks